United States Patent
Kataoka

(10) Patent No.: US 11,591,997 B2
(45) Date of Patent: Feb. 28, 2023

(54) INTERNAL-COMBUSTION-ENGINE IGNITION APPARATUS

(71) Applicant: Mitsubishi Electric Corporation, Tokyo (JP)

(72) Inventor: Naoki Kataoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/670,580

(22) Filed: Feb. 14, 2022

(65) Prior Publication Data

US 2022/0341385 A1 Oct. 27, 2022

(30) Foreign Application Priority Data

Apr. 21, 2021 (JP) .............................. JP2021-071539

(51) Int. Cl.
*F02P 3/04* (2006.01)
(52) U.S. Cl.
CPC .................................. *F02P 3/0428* (2013.01)
(58) Field of Classification Search
CPC .................................................... F02P 3/0428
USPC ................ 123/260, 605, 618, 620, 630, 634
See application file for complete search history.

(56) References Cited

U.S. PATENT DOCUMENTS

| | | | | |
|---|---|---|---|---|
| 9,399,979 B2 * | 7/2016 | Heise | ....................... | F02P 9/002 |
| 11,417,459 B2 * | 8/2022 | Naruse | ....................... | F02P 3/02 |
| 2020/0358263 A1 | 11/2020 | Muramoto et al. | | |

FOREIGN PATENT DOCUMENTS

| | | | | |
|---|---|---|---|---|
| JP | 11-336650 A | | 12/1999 | |
| JP | 2004044404 | * | 2/2004 | .............. F02B 19/14 |
| JP | 2017-103179 A | | 6/2017 | |
| JP | 2020-183735 A | | 11/2020 | |
| WO | 2016/157541 A1 | | 10/2016 | |

OTHER PUBLICATIONS

Office Action dated May 24, 2022 issued by the Japanese Patent Office in Japanese Application No. 2021-071539.

\* cited by examiner

*Primary Examiner* — Hai H Huynh
(74) *Attorney, Agent, or Firm* — Sughrue Mion, PLLC

(57) ABSTRACT

The objective is to obtain an internal-combustion-engine ignition apparatus that raises the ignitability at a time when a smolder occurs. An internal-combustion-engine ignition apparatus having a main combustion chamber and a subsidiary combustion chamber includes
   an ignition plug,
   an ignition coil having a primary coil, a secondary coil, and a tertiary coil,
   a first switching circuit that turns on or off energization of the primary coil,
   a second switching circuit that turns on or off energization of the tertiary coil, and
   a control apparatus that estimates a combustion state, that performs on/off-control of the first switching circuit so that a spark discharge is produced in the ignition plug and that performs on/off-control of the second switching circuit so that magnetic flux in the tertiary coil is changed so as to increase a secondary current, when deterioration of a combustion state has been estimated.

10 Claims, 6 Drawing Sheets

INTERNAL-COMBUSTION-ENGINE IGNITION APPARATUS

BACKGROUND OF THE INVENTION

Field of the Invention

The present disclosure relates to an internal-combustion-engine ignition apparatus.

Description of the Related Art

As countermeasures for global warming that has been problematized in recent years, world-wide approach to reduce greenhouse effect gas has started. Because this approach is required also in the automobile industry, development for improving the efficiency of an internal combustion engine is being promoted.

Among internal combustion engines, attention has been being paid to an internal combustion engine provided with a subsidiary combustion chamber having an orifice at the front end of an ignition plug. A fuel-air mixture is ignited in the subsidiary combustion chamber and then combustion flame is injected through the orifice into a main combustion chamber. The internal combustion engine in which a fuel-air mixture in the main combustion chamber is ignited with the injected combustion flame is referred to as a subsidiary-chamber-type internal combustion engine (for example, Patent Document 1). Because in this method, multi-point ignition can rapidly be applied to the fuel-air mixture in the main combustion chamber, the combustion period can be shortened even with a lean fuel-air mixture; thus, the internal combustion engine can efficiently and stably be operated.

Accordingly, because the thermal efficiency can largely be raised, the method has been drawing attention, as a method in which the exhaust amount of greenhouse effect gas can largely be reduced.

PRIOR ART REFERENCE

Patent Document

[Patent Document 1] Japanese Patent Application Laid-Open No. 2017-103179

SUMMARY OF THE INVENTION

In a subsidiary-chamber-type internal combustion engine, because the subsidiary combustion chamber is connected with the main combustion chamber though an orifice, there exists a problem in terms of the scavenging performance. When the load is small, burned gas produced by combustion is liable to stagnate in the subsidiary combustion chamber. Accordingly, an ultra-lean state occurs and hence a misfire may be caused.

Moreover, under a cold engine state where the engine is cold, liquid droplets of the fuel may adhere to the inside of the subsidiary combustion chamber and the surroundings of an ignition plug. In this situation, an unburned fuel is heated and hence soot is produced. There is posed a problem that because the soot piles up on the electrodes of the ignition plug and hence the ignition plug is brought into a smolder state, a misfire is caused.

In order to solve the foregoing problems, for example, as disclosed in Patent Document 1, the respective shapes of the ignition-plug electrode portions, the subsidiary combustion chamber, the orifice, and the like and the positional relationship thereamong are being contrived and accurate arrangement thereof is being studied. However, there changes the environment around the ignition plug and the subsidiary combustion chamber, such as various shapes of internal combustion engines, wide-range operational conditions, carbon adhesion to and carbon deposits on the electrodes of the ignition plug, deterioration and consumption of the electrodes, and the like. Accordingly, it is difficult to cope with the foregoing problems only with a mechanical structure and hence neither the ultra-lean state of the fuel-air mixture in the subsidiary chamber nor the occurrence of the smolder can sufficiently be suppressed; thus, there has been a probability that a misfire is caused.

The objective of the present disclosure is to obtain an internal-combustion-engine ignition apparatus that can solve the foregoing problems. That is to say, the objective thereof is to provide an internal-combustion-engine ignition apparatus that effectively raises the ignitability under the environment where scavenging in the subsidiary chamber is insufficient and at a time when a smolder occurs in the ignition plug so that a misfire is suppressed and hence stable operation can be performed.

An internal-combustion-engine ignition apparatus according to the present disclosure is an ignition apparatus for an internal combustion engine having a main combustion chamber and a subsidiary combustion chamber in which a fuel-air mixture of the main combustion chamber is ignited with combustion gas to be injected through an orifice provided between the main combustion chamber and the subsidiary combustion chamber; the internal-combustion-engine ignition apparatus includes an ignition plug provided in the subsidiary combustion chamber, an ignition coil having a primary coil, a secondary coil that is magnetically coupled with the primary coil and supplies a secondary current to the ignition plug, and a tertiary coil magnetically coupled with the primary coil and the secondary coil, a first switching circuit that turns on or off energization from a power source to the primary coil, a second switching circuit that turns on or off energization from the power source to the tertiary coil, and a control apparatus that estimates a combustion state in the subsidiary combustion chamber based on an operating state of an internal combustion engine, that performs on/off-control of the first switching circuit so that a secondary current is generated in the secondary coil by a change in magnetic flux generated in the primary coil and a spark discharge is produced in the ignition plug and that performs on/off-control of the second switching circuit so that magnetic flux in the tertiary coil is changed so as to increase the secondary current, when deterioration of a combustion state has been estimated in the subsidiary combustion chamber.

An internal-combustion-engine ignition apparatus according to the present disclosure effectively raises the ignitability under the environment where scavenging in the subsidiary chamber is insufficient and at a time when a smolder occurs in the ignition plug so that a misfire is suppressed and hence stable operation can be performed.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, internal-combustion-engine ignition apparatuses according to the present disclosure will be explained with reference to the drawings. Hereinafter, an internal-combustion-engine ignition apparatus will be referred to simply as an ignition apparatus.

1. Embodiment 1

<Configuration of Internal Combustion Engine>

Figure 1:
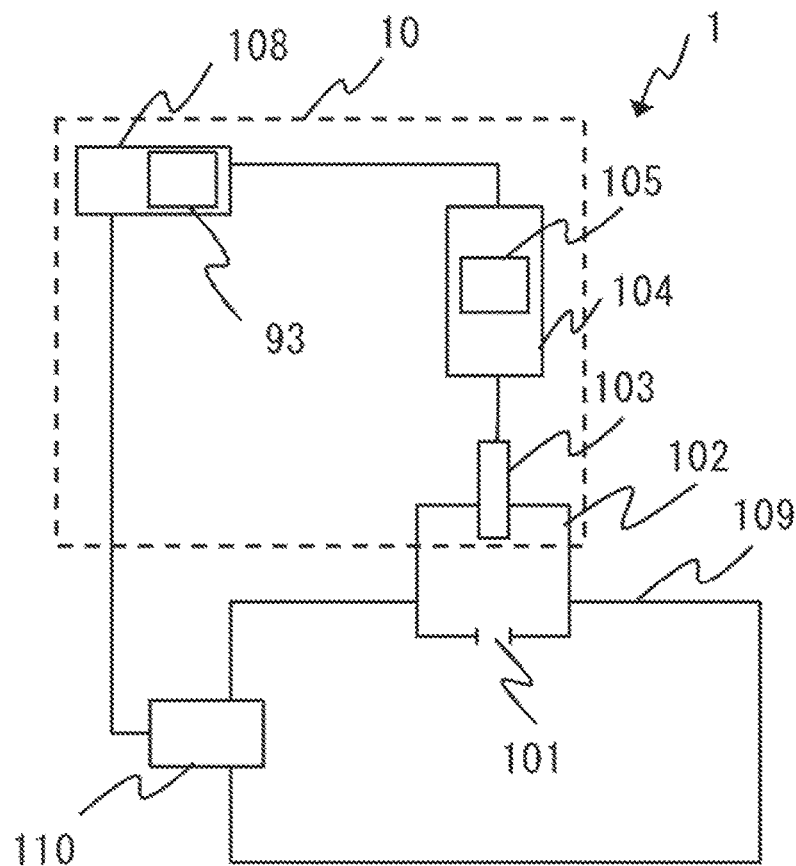
FIG. 1 is a configuration diagram of an internal combustion engine according to Embodiment 1.

FIG. 1 is a configuration diagram of an internal combustion engine 1 according to Embodiment 1 and is a simplified conceptual diagram. The internal combustion engine 1 has a main combustion chamber 309, a subsidiary combustion chamber 102, an orifice 101 that makes the main combustion chamber 109 and the subsidiary combustion chamber 102 communicate with each other, a fuel injector 110, and an ignition apparatus 10. The ignition apparatus 10 has a control apparatus 108, an ignition coil 104, and an ignition plug 103. The main combustion chamber 109 has an intake port communicating with an intake pipe, an exhaust port communicating with an exhaust pipe, and a movable piston that is connected with a rod coupled with a crankshaft and produces an output; however, in FIG. 1, the descriptions therefor are omitted.

The fuel injector 110 injects a fuel into the main combustion chamber 309, so that a fuel-air mixture is formed. The fuel-air mixture passes through the orifice 101 so as to be supplied into the subsidiary combustion chamber 102.

The control apparatus 108 of the ignition apparatus 10 turns on or off the primary current of the ignition coil 104 by way of the output circuit 93, so that a high-voltage secondary current is generated at the secondary side of the ignition coil 104. The ignition coil 104 supplies a high voltage to the ignition plug 103. The ignition plug 103 has an electrode to which the high voltage is transferred, and forms a spark discharge between the electrode and a ground (grounding) electrode in response to application of the high voltage.

The fuel-air mixture in the subsidiary combustion chamber 102 is ignited by the spark discharge in the ignition plug 103; combustion flame grows in the subsidiary combustion chamber 102; then, the pressure in the subsidiary combustion chamber rises. After that, high-temperature combustion gas is blown into the main combustion chamber through the orifice, so that the fuel-air mixture in the main combustion chamber is ignited. Accordingly, ignition of the fuel-air mixture in the main combustion chamber is facilitated and hence it is made possible that a lean fuel-air mixture stably combusts. The control apparatus 108 can contribute to improvement of the thermal efficiency of the internal combustion engine 1 by expanding a lean-combustion area.

By controlling an energy-changeable circuit 105, the control apparatus 108 of the ignition apparatus 10 can increase the secondary current to be supplied by the ignition coil. Increasing the secondary current when required makes it possible to strengthen the energy of ignition by the ignition plug 103, to prevent a misfire, and to suppress a smolder from occurring.

The number of the orifices 101 that are provided in the subsidiary combustion chamber 102 so as to inject combustion gas into the main combustion chamber 109 may be plural; in general, the orifices 101 are provided at three to eight positions. Among subsidiary-chamber-type internal combustion engines, there exist a so-called active-type one in which the fuel injector 110 is disposed in the subsidiary combustion chamber 102 so that a fuel is directly injected into the subsidiary combustion chamber 102 and a so-called passive-type one in which the fuel injector 110 is not disposed in the subsidiary combustion chamber 102 and in which a fuel injected into the main combustion chamber 109 is introduced into the subsidiary combustion chamber by means of a pressure difference between the main combustion chamber 109 and the subsidiary combustion chamber 102. The ignition apparatus 10 according to Embodiment 1 can be applied to any one of the foregoing methods. In FIG. 1, the fuel injector 110 is disposed in the main combustion chamber 109; however, the fuel injector 110 may be provided in an intake pipe or in an intake port.

There exists a method in which the ignition plug 103 is disposed not only in the subsidiary combustion chamber 102 but also in the main combustion chamber 109; the ignition apparatus 10 according to Embodiment 1 can be applied to the case where the ignition plug is disposed in the main combustion chamber. Moreover, FIG. 1 represents an example in which the control apparatus 108 of the ignition apparatus 10 controls the fuel injector 110; however, the fuel injector 110 may be controlled by another fuel-injection control apparatus.

<Hardware Configuration of Control Apparatus>

Figure 2:
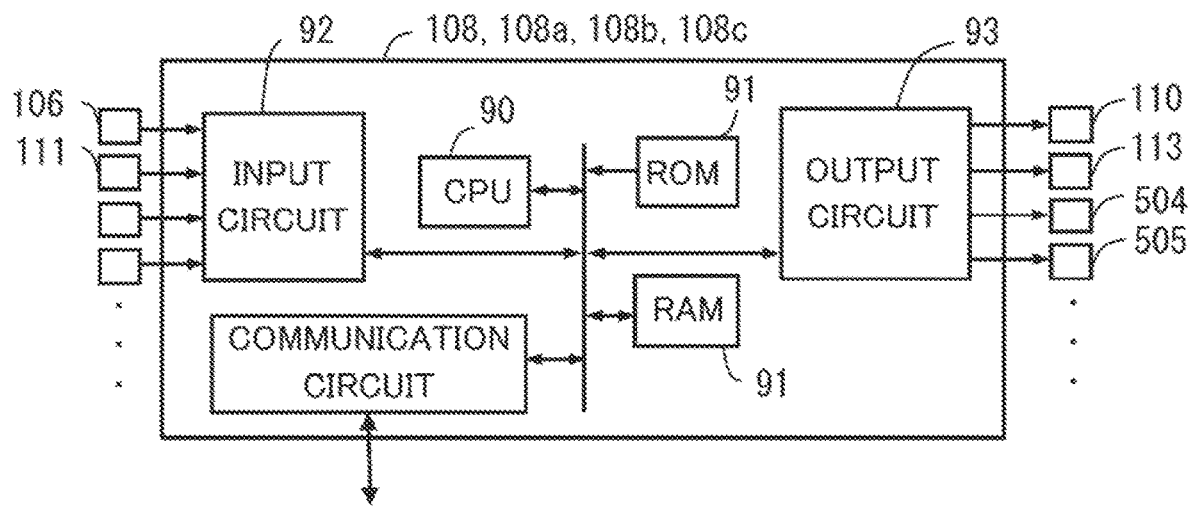
FIG. 2 is a hardware configuration diagram of a control apparatus in an internal-combustion-engine ignition apparatus according to Embodiment 1.

FIG. 2 is a hardware configuration diagram of the control apparatus 108 in the ignition apparatus 10 according to Embodiment 1. The configuration in FIG. 2 can be applied also to respective control apparatuses 108a, 108b, and 108c, described in Embodiments 3 through 6; however, as a representative, the control apparatus 108 will be explained here. The control apparatus 108 is a control apparatus for controlling an ignition apparatus. Respective functions of the control apparatus 108 are realized by processing circuits provided in the control apparatus 108. Specifically, as illustrated in FIG. 2, the control apparatus 108 includes, as the processing circuits, a computing processing unit (computer) 90 such as a CPT) (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, and the like. Various kinds of sensors and switches such as a crank angle sensor, a cam angle sensor, an intake quantity detection sensor, a water temperature sensor, a power-source voltage sensor, an ion current detection circuit 106, and a smolder detection circuit 113 are connected with the input circuit 92; the input circuit 92 is provided with an A/D converter and the like that input the output signals of these sensors and switches to the computing processing unit 90. The output circuit 93 is connected with electric loads such as a first switching circuit 504, a second switching circuit 505, the fuel injector 110, and an inner-cylinder-flow enhancement apparatus 113 and is provided with a driving circuit and the like for converting a control signal from the computing processing unit 90 and then outputting the converted control signal to these electric loads.

The computing processing unit 90 executes software items (programs) stored in the storage apparatus 91 such as a ROM and collaborates with other hardware devices in the control apparatus 103, such as the storage apparatus 91, the input circuit 92, and the output circuit 93, so that the respective functions provided in the control apparatus 108 are realized. Setting data items such as a threshold value and a determination value to be utilized in the control apparatus 108 are stored, as part of software items (programs), in the storage apparatus 91 such as a ROM. It may be allowed that the respective functions included in the control apparatus 108 are configured with either software modules or combinations of software and hardware.

<Configuration of Ignition Apparatus>

Figure 3:
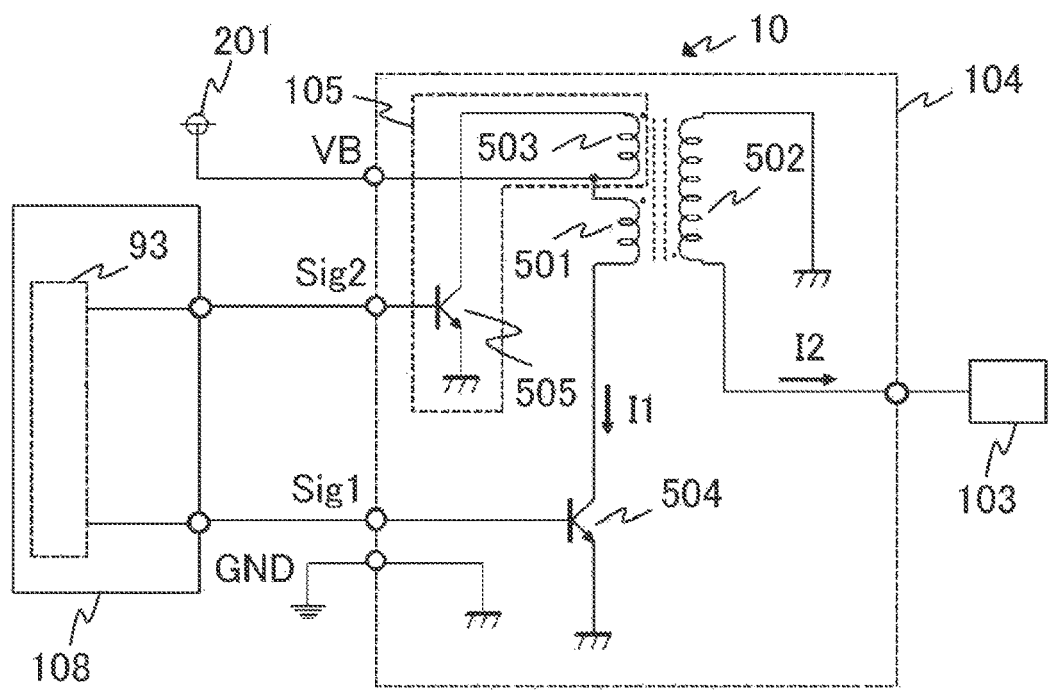
FIG. 3 is a circuit diagram of the internal-combustion-engine ignition apparatus according to Embodiment 1.

FIG. 3 is a circuit diagram of the ignition apparatus 10 according to Embodiment 1. The ignition apparatus 10 includes the control apparatus 108, the ignition coil 104, and the ignition plug 103. The ignition coil 104 has a primary coil 501, a secondary coil 502, and the energy-changeable circuit 105.

Energization causes energization magnetic flux in the primary coil 501. Due to a change in the magnetic flux in the primary coil 501, a secondary current is generated in the secondary coil 502 magnetically coupled with the primary coil 501. The secondary current in the secondary coil 502 supplies discharging energy to the ignition plug 103, so that a spark discharge occurs. The energy-changeable circuit 105 has a function of increasing the secondary current in the secondary coil 502.

One end of the primary coil 501 is connected with a DC ignition-coil power source 201 (described "VB" in FIG. 3), and the other end of the primary coil 501 is grounded to the ground (described "GND" in FIG. 3) by way of the first switching circuit 504. The other end of a tertiary coil 503 utilized in the energy-changeable circuit 105 is connected with the ignition-coil power source 201 with which the one end of the primary coil 501 is connected; the primary coil 501 and the tertiary coil 503 are wound in such a way that the respective polarities thereof are reverse to each other, when viewed from the ignition-coil power source 201. The collector of the second switching circuit 505 represented as an NPN-type transistor is connected with the low-voltage side of the tertiary coil 503, and the emitter thereof is connected with the ground. A current from the DC power source energizes or deenergizes the tertiary coil by turning on or off the second switching circuit 505. The energy-changeable circuit 105 is disposed in the case of the ignition coil 104 and is grounded in the ignition coil. In FIG. 3, grounding is represented as GND; however, the grounding may be performed through connection with the negative electrode of a battery.

The first switching circuit 504 is a switching circuit for turning on or off energization from the DC ignition-coil power source 201 to the primary coil 501. An ignition signal Sig 1 outputted from the output circuit 93 of the control apparatus 106 is inputted to the first switching circuit 504. The ignition signal Sig 1 turns on or off the first switching circuit 504.

The second switching circuit 505 is a switching circuit for turning on or off energization of the tertiary coil 503. A signal Sig 2 outputted from the output circuit 93 of the control apparatus 108 is inputted to the second switching circuit 505. The signal Sig 2 turns on or off the second switching circuit 505.

In FIG. 3, each of the first switching circuit 504 and the second switching circuit 505 is represented by a circuit utilizing an NPN-type transistor; however, it may be allowed that a PNP-type transistor, an IGBT (Insulated Gate Bipolar Transistor), a MOSFET (Metal Oxide Semiconductor Field Effect Transistor), or the like is utilized.

<Ignition Control>

As basic control, the control apparatus 108 calculates the rotation speed of the internal combustion engine, the efficiency of filling the fuel-air mixture into the cylinder, the fuel injection amount, the ignition timing, and the like, based on inputted output signals of the various kinds of sensors. Then, based on the results of the calculations, the control apparatus 108 performs driving control of the fuel injector 110, the first switching circuit 504, and the second switching circuit 505.

The control apparatus 108 turns on the first switching circuit 504 so as to energize the primary coil 501. After that, the control apparatus 308 turns off the first switching circuit 504 so as to de-energize the primary coil 501, so that a spark discharge is caused to occur in the ignition plug 103.

The control apparatus 108 calculates an energization period for the primary coil 501 and an ignition timing (ignition crank angle). During the energization period, the control apparatus 108 turns on the first switching circuit 504 so as to energize the primary coil 501. After that, in synchronization with the ignition timing, the control apparatus 108 turns off the first switching circuit 504 so as to de-energize the primary coil 501. The de-energization makes the secondary coil 502 generate a high voltage, so that a spark discharge is caused to occur in the ignition plug 103.

The spark discharge continues until magnetic energy accumulated in the iron core of the ignition plug 103 decreases. In the present embodiment, the explanation has been made with a flyback method in which a primary current is cut off so as to make the secondary coil generate a high voltage. However, a forward method in which primary-current energization makes the secondary coil generate a high voltage can also be utilized. In that case, it is made possible that the first switching circuit 504 is turned on so as to generate a secondary current in the secondary coil.

<Smolder, Misfire>

In the internal combustion engine 1, there exists a phenomenon in which a fuel-air mixture neither catches fire nor combusts. This phenomenon is referred to as a misfire. There exists a case where supply of a fuel is cut off and hence no combustion occurs in the main combustion chamber 103, and a misfire occurs also in this case; however, in many cases, this phenomenon is referred to as a fuel cut and is distinguished from a misfire. Moreover, in some cases, a too rich or a too lean fuel-air mixture makes combustion unstable and leads it to a misfire.

In the subsidiary-chamber-type internal combustion engine 1, because the subsidiary combustion chamber 102 is connected with the main combustion chamber 109 though the orifice 101, there exists a problem in terms of the scavenging performance. Burned gas produced by combustion is not exhausted and is liable to stagnate in the subsidiary combustion chamber 102. Accordingly, especially at a time of a low load, because of being pushed back by stagnant burned gas in the subsidiary combustion chamber 102, a fresh fuel-air mixture may not sufficiently be supplied to the subsidiary combustion chamber 102 during an intake stroke or a compression stroke. In this case, residual burned gas (nonflammable gas) in the subsidiary combustion chamber 102 may raise the self-EGP ratio, deteriorate the ignitability, and cause a misfire. In addition, at a time of high rotation and a high load, the flow rate of a fuel-air mixture that flows from the main combustion chamber into the subsidiary combustion chamber through the orifice is accelerated during the compression stroke. Accordingly, a spark discharge produced between the electrodes of the ignition plug provided in the subsidiary combustion chamber is liable to be blown out. It is conceivable that this state causes not only deterioration of the ignition performance of the ignition plug but also a misfire state.

Staining and damaging caused by carbon adhesion to and carbon deposits on the electrodes of the ignition plug deteriorate the ignition performance and make a smolder occur. Under a cold engine state where the internal combustion engine 1 is cold, liquid droplets of the fuel may adhere to the inside of the subsidiary combustion chamber 102 and the surroundings of the ignition plug 103. In this situation, an unburned fuel is heated and hence soot is produced. Because the soot piles up on the electrodes of the ignition plug 103 and hence the ignition plug 103 is brought into a smolder state, a misfire is caused. Furthermore, the ignition performance of the electrodes of the ignition plug 103 may fall due to aging deterioration or exhaustion. The effects of these problems may deteriorate the ignitability and then cause a smolder and a misfire.

When any of these smolder and misfire occurs, the output of the internal combustion engine 1 is reduced. Concurrently, any of these smolder and misfire causes the environment to be deteriorated by discharging an unburned fuel-air mixture. Moreover, because when starting to combust during the exhaust stroke, an unburned fuel-air mixture may combust in the exhaust pipe or in the catalyst, a misfire may become a cause of damage to the internal combustion engine 3. Therefore, it is important that in the internal combustion engine 1, the occurrence of a smolder or a misfire is estimated and is suppressed.

<Control of Energy-Changeable Circuit>

Figure 4:
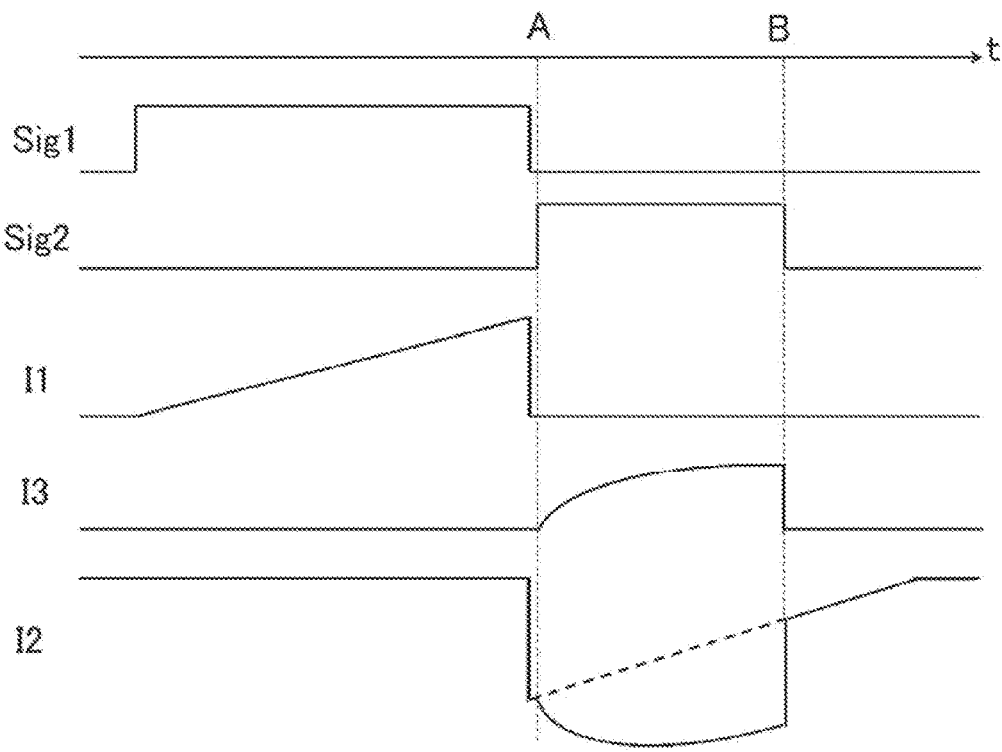
FIG. 4 is a timing chart representing operation of the internal-combustion-engine ignition apparatus according to Embodiment 1.

FIG. 4 is a timing chart representing operation of the ignition apparatus 10 according to Embodiment 1. When during a spark discharge, the tertiary coil 503 in the energy-changeable circuit 105 is energized, a current flows in the direction for increasing the secondary current in the secondary coil 502. The operational waveforms in the ignition apparatus in this situation will be explained by use of FIG. 4.

In the timing chart in FIG. 4, the abscissa denotes a time point (or a crank angle). In sequence from top to bottom of FIG. 4, there are represented the ignition signal Sig 1 for controlling the first switching circuit 504, the signal Sig 2 for controlling the second switching circuit 505, a primary current I1 flowing in the primary coil 501, a tertiary current I3 flowing in the tertiary coil 503, and a secondary current I2 flowing in the secondary coil 502.

The control apparatus 108 supplies the ignition signal Sig 1 for controlling the first switching circuit 504 so as to turn on or off the first switching circuit 504, so that the energization current in the primary coil 503 flows or is cut off. When the primary current I1 is cut off, a negative large voltage is generated across the secondary coil 502, due to a mutual inductive action. This voltage causes a dielectric breakdown in the gap of the ignition plug 103 and hence a discharge is produced. In this situation, a negative secondary current I2 flows in the secondary coil 502. The positive direction of the secondary current I2 is indicated by an arrow in FIG. 3.

The control apparatus 108 turns off the first switching circuit 504 by means of the ignition signal Sig 1; then, after the secondary current is generated, the control apparatus 108 turns on the second switching circuit 505 by means of the signal Sig 2 at a timing (A). After the secondary current has been generated, the signal Sig 2 turns on the second switching circuit 505, so that energization flux for increasing the secondary current can be generated. As a result, the absolute value of the secondary current I2, represented in FIG. 4, at a time when the second switching circuit 505 is turned on and a discharge occurs increases (represented by a solid line) in comparison with the absolute value of the secondary current I2 (represented by a broken line) only with the first switching circuit 504. In FIG. 4, the second switching circuit 505 is turned off at a timing (B). Maintaining a large secondary current makes it possible that even when the scavenging performance of the subsidiary combustion chamber 102 is low and hence the fuel-air mixture is brought into an ultra-lean state or even when carbon adheres to the insulator surface of the ignition plug 103 and hence a smolder state occurs, the ignitability is effectively improved and hence a misfire is suppressed.

In Embodiment 1, the control apparatus 108 can perform the secondary-current-increasing control with the energy-changeable circuit 105. The control apparatus 108 can estimate the combustion state based on the operating state of the internal combustion engine 1 and determine whether or not the control should be performed. For example, it may be allowed that when a smolder or a misfire is determined based on a detection value obtained through an inner-cylinder pressure sensor, a rotational fluctuation of the internal combustion engine 1, and the like, the secondary-current-increasing control is performed. In addition, it may also be allowed that in order to reduce the control loads on the microcomputer, the secondary-current-increasing control is performed under a preliminarily instructed specific operational condition. For example, it may also be allowed that in the case where there are satisfied all the conditions that the rotation speed of the internal combustion engine 1 is the same as or lower than 2000 [rev/min], that the throttle opening degree is the same as or lower than 20%, and that the coolant temperature of the internal combustion engine 1 is lower than 80° C., it is determined that the probability that a smolder or a misfire occurs is high and then the secondary-current-increasing control is performed. Alternatively, it may also be allowed that in the case where there is satisfied at least one of the conditions that the rotation speed of the internal combustion engine 1 is the same as or lower than 2000 [rev/min], that the throttle opening degree is the same as or lower than 20%, and that the coolant temperature of the internal combustion engine 1 is lower than 80° C., it is determined that the probability that a smolder or a misfire occurs is high and then the secondary-current-increasing control is performed and that in the case where none of the foregoing conditions is satisfied, the secondary-current-increasing control is not performed.

2. Embodiment 2

Figure 5:
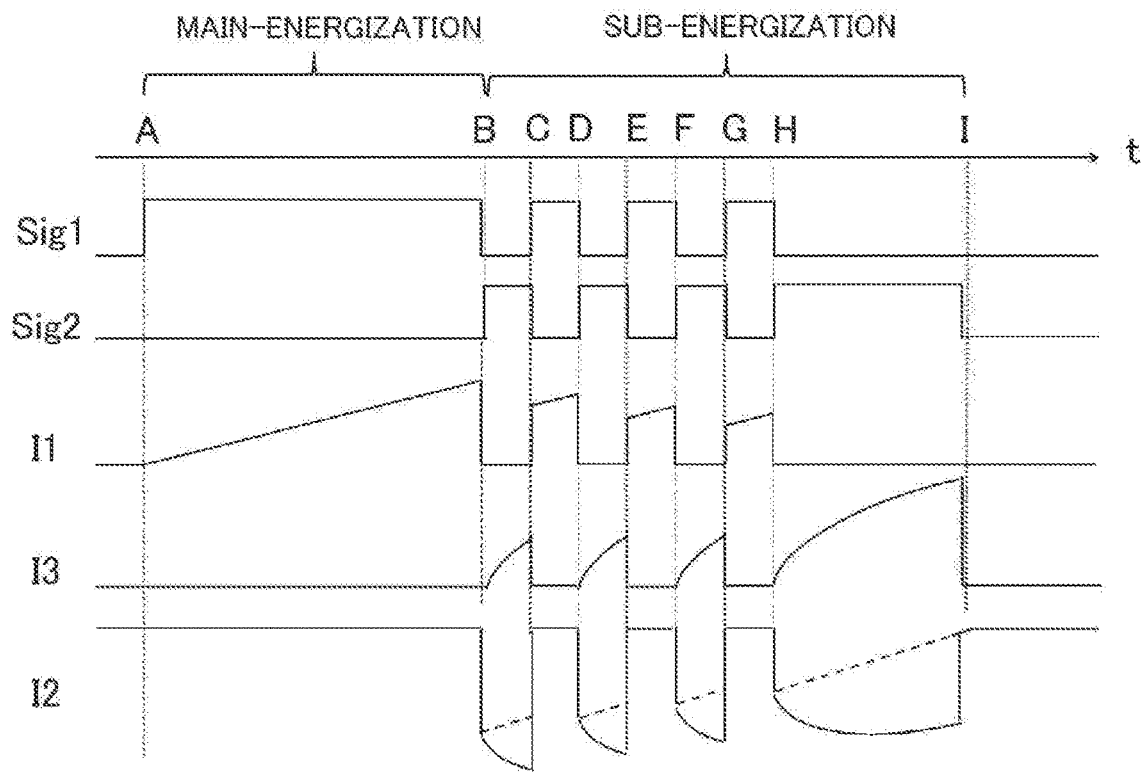
FIG. 5 is a timing chart representing operation of an internal-combustion-engine ignition apparatus according to Embodiment 2.

FIG. 5 is a timing chart representing operation of the ignition apparatus 10 according to Embodiment 2. The basic circuit configuration and operational principle of the ignition apparatus 10 according to Embodiment 2 are the same as those of Embodiment 1. However, Embodiment 2 is different from Embodiment 1 in that the ignition signal Sig 1 and the signal Sig 2 are turned on and off two or more times in the same combustion stroke. The control apparatus 103 performs sub-energization two or more times under an operational condition in which it is determined that the ignitability needs to be raised. Because being the same as Embodiment 1, the hardware configuration of the ignition apparatus according to Embodiment 2 will be explained as the ignition apparatus 10 and the control apparatus 108.

In the timing chart in FIG. 5, the abscissa denotes a time point (or a crank angle). In sequence from top to bottom of FIG. 5, there are represented the ignition signal Sig 1 for controlling the first switching circuit 504, the signal Sig 2 for controlling the second switching circuit 505, the primary current I1 flowing in the primary coil 501, the tertiary current I3 flowing in the tertiary coil 503, and the secondary current I2 flowing in the secondary coil 502.

An energization-starting timing (A) for the first switching circuit 504 signifies a main-energization energization-starting timing at which the primary current is applied to the primary coil 501. An ignition timing (B) signifies an ignition timing at which the primary current flowing in the primary coil 501 is cut off. Each of energization-starting timings (C), (E), and (G) signifies a sub-energization energization-starting timing at which the primary current is applied again to the primary coil 501 in the same combustion stroke, after the ignition timing (B) at which the primary coil 501 is de-energized.

Each of ignition timings (D), (F), and (H) signifies a sub-energization ignition timing at which the primary current flowing in the primary coil 501 is cut off. The signal Sig 2 is provided as the inverted signal of the ignition signal Sig 1 and keeps the tertiary current I3 applied until a discharge ending timing (I). The broken line represents the output waveform of the secondary current at a time when control of the energy-changeable circuit is not performed. The solid line represents the output waveform of the secondary current that increases when the control of the energy-changeable circuit is performed.

The second switching circuit 505 is on/off-controlled at each of the discharging-period timings (B to C), (D to E), and (H to I), so that the tertiary current I3 is applied to the tertiary coil 503 and hence the secondary current I2 is increased during each of the discharging periods, as represented by the solid line. As a result, two or more spark discharges occur and hence the discharge time increases; in addition to that, the secondary current increases; thus, it is made possible to effectively improve the ignitability and to suppress a misfire.

In Embodiment 2, it may be allowed that the sub-energization control in which the first switching circuit 504 and the second switching circuit 505 are each turned on and off two or more times is performed when a smolder or a misfire is determined. However, it may also be allowed that the sub-energization control is performed when under a preliminarily instructed specific operational condition, it is determined that the probability of the occurrence of a smolder or a misfire occurs is high.

Moreover, it may be allowed that in accordance with the operating state of a vehicle in which the internal combustion engine 1 is mounted, the control apparatus 108 determines the number of times of the on/off-control actions of the second switching circuit in each compression and combustion stroke of the internal combustion engine 1. For example, it may be allowed that when a smolder or a misfire is determined based on a detection value obtained through an inner-cylinder pressure sensor, a rotational fluctuation of the internal combustion engine 1, and the like, the control apparatus 108 determines, depending on the extent of the smolder or the misfire, the number of times of the on/off-control actions in each of which the second switching circuit is turned on and off in order to perform the secondary-current-increasing control.

It may also be allowed that the control apparatus 108 determines the number of times of the secondary-current-increasing control actions, in accordance with a preliminarily instructed specific operational condition. For example, it may also be allowed that in the case where there are satisfied all the conditions that the rotation speed of the internal combustion engine 1 is the same as or lower than 2000 [rev/min], that the throttle opening degree is the same as or lower than 20%, and that the water temperature is lower than 80° C., it is determined that the probability that a smolder or a misfire occurs is high and then the secondary-current-increasing control is performed, and it may also be allowed that the number of times of the secondary-current-increasing control actions is increased as the rotation speed of the internal combustion engine 1 decreases more, as the throttle opening degree decreases more, or as the coolant temperature of the internal combustion engine 1 falls more. The forgoing method makes it possible to increase the secondary current as the probability of the occurrence of a smolder or a misfire rises; thus, combustion in the internal combustion engine 1 can be further stabilized.

3. Embodiment 3

Figure 6:
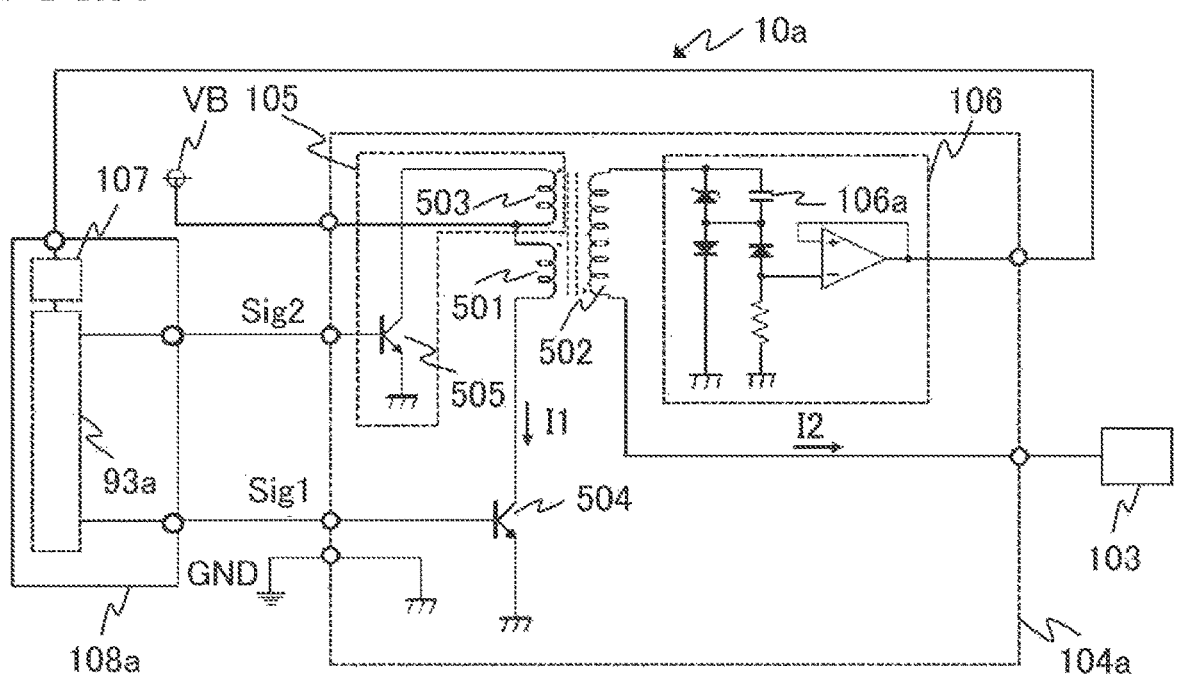
FIG. 6 is a circuit diagram of the internal-combustion-engine ignition apparatus according to Embodiment 3.
Figure 7:
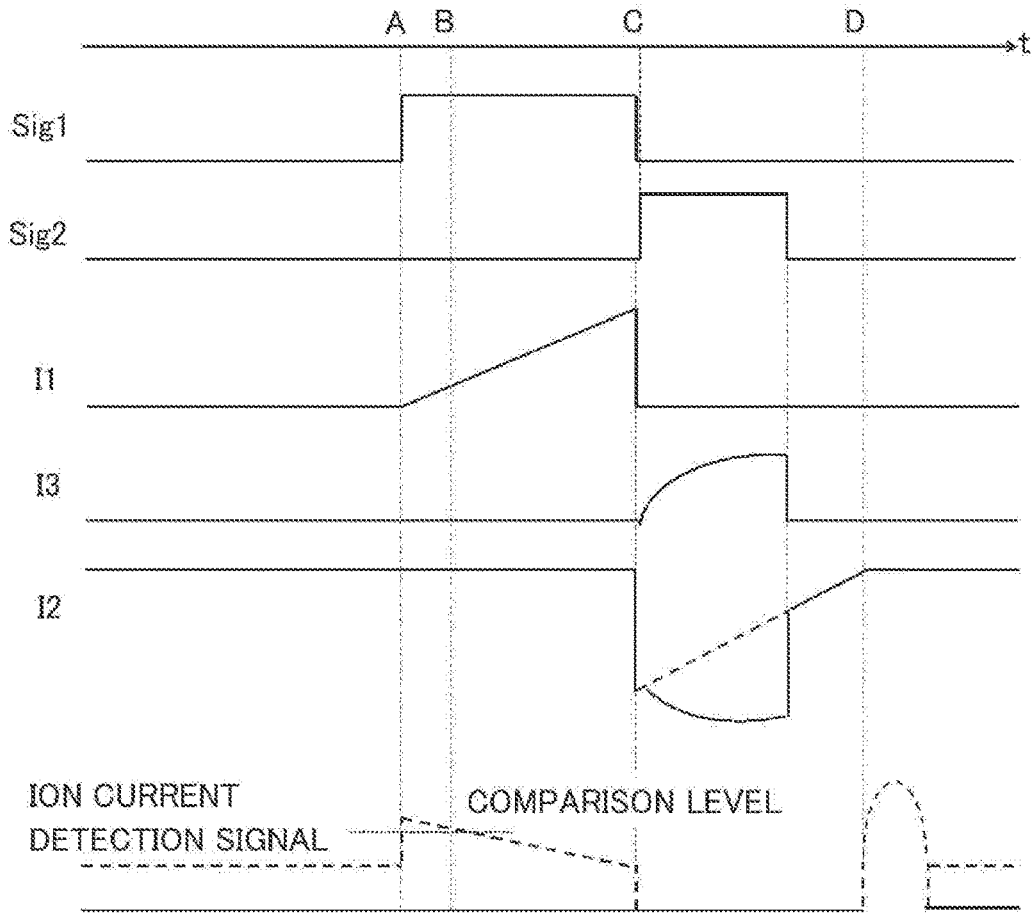
FIG. 7 is a timing chart representing operation of the internal-combustion-engine ignition apparatus according to Embodiment 3.

FIG. 6 is a circuit diagram of an ignition apparatus 10a according to Embodiment 3. FIG. 7 is a timing chart representing operation of the ignition apparatus 10a according to Embodiment 3.

The ignition apparatus 10a according to Embodiment 3 is different from the ignition apparatus according to each of Embodiments 1 and 2 in that the ignition apparatus 10a includes the ion current detection circuit 106 and an ion current diagnosis unit 107 for detecting the misfire state of the ignition plug 103 in the subsidiary combustion chamber 102.

The ion current detection circuit 106 for detecting an ion current in the subsidiary combustion chamber 102 transmits the detected ion current detection amount to the ion current diagnosis unit 107 in the control apparatus 10a. The ion current detection amount is received by the computing processing unit 90 in the control apparatus 108a by way of an A/D converter. The ion current diagnosis unit 107 is configured as software in the computing processing unit 90.

In accordance with the operational condition of the internal combustion engine 1, the ion current diagnosis unit 107 can diagnose (estimate) the combustion state in the subsidiary combustion chamber 102, based on the ion current detection amount. The ion current diagnosis unit 107 can diagnose, in real time, the misfire state and a smolder in the subsidiary combustion chamber 102. The ion current diagnosis unit 107 makes it possible to diagnose (estimate) an abnormality in the combustion state of the internal combustion engine 1 at an early stage; therefore, the reliability can be raised, while a lean fuel-air mixture in the internal combustion engine 1 can stably combust.

Because the ion current detection circuit 106 is provided in the package of the ignition coil 104, it is made possible to simply diagnose the combustion state of the internal combustion engine 1 and to estimate the occurrence of a smolder and a misfire. The ion current detection circuit 106 is connected with one end of the secondary coil 502 and generates a voltage (e.g., a voltage of substantially 20 V through 200 v) for detecting an ion current, which is a voltage separated from a high voltage for causing a discharge. The ion current detection circuit 106 is provided inside the ignition coil 104; the ignition plug 103 has also a function as a current detection probe.

The power source apparatus 106 charges a capacitor 106a while the ignition coil 104 operates to generate a high voltage for a spark discharge. Then, the voltage accumulated in the capacitor 106a is applied to the central electrode of the ignition plug 103. The configuration as described above makes it possible that a very compact, low-cost, and simple system configuration can detect an ion current and can estimate the occurrence of a smolder and a misfire.

In the case where a smolder occurs in the subsidiary combustion chamber 102 and spreads also to the ignition plug 103, a current flows in the ignition plug in accordance with the smolder state when a voltage is applied to the central electrode of the ignition plug 103; the ion current detection circuit 106 outputs to the ion current diagnosis unit 107 a smolder detection signal (an ion current detection signal) corresponding to the smolder, as represented in FIG. 7, for example. The smolder detection signal in a normal state where no smolder has occurred becomes a signal having substantially the same level as the ground (GND) in the section where no combustion and the like have not occurred, as represented by the solid line in FIG. 7.

The smolder state of the ignition plug 103 is estimated by the ion current detection circuit 106 and the ion current diagnosis unit 107 provided in the control apparatus 108a. The ion current diagnosis unit 107 sets at least one smolder comparison level and estimates that a smolder has occurred in the ignition plug 103, when the ion current detection signal exceeds the comparison level. (The broken line represents the ion current detection signal waveform in this case.) In this situation, in order to raise the ignitability, the control apparatus 108a controls the second switching circuit 505 by way of the output circuit 93 so as to increase the secondary current. As a result, only in the case where it has been estimated that a smolder has occurred in the ignition plug 103, the secondary current is increased; thus the ignitability can effectively be improved.

In Embodiment 3, the timing (A to B) in FIG. 7 signifies the diagnosis section where the diagnosis can simply and effectively be performed. The specific smolder diagnosis section (A to B) in a primary-coil energization period (A to C) is a section having a length of substantially 0.5 [ms]. The ion current diagnosis unit 107 sets a comparison level and estimates that a smolder has occurred in the subsidiary combustion chamber 102, when the smolder detection signal (ion current detection signal) becomes the same as or higher than the comparison level. The secondary current I2 becomes "0" at the timing (D).

It may be allowed that the smolder level is stepwise diagnosed in accordance with the level of the smolder detection signal in the diagnosis section (A to B). For example, in such a manner as described below, it may be allowed that multistep flags are set and then the diagnosis is performed. When the detection average in two or more cycles is smaller than 10 [μA], a diagnostic result flag is set to "0"; when the average is the same as or larger than 10 [μA] but smaller than 20 [μA], the diagnostic result flag is set to "1"; when the average is the same as or larger than 20 [μA] but smaller than 50 [μA], the diagnostic result flag is set to "2"; when the average is the same as or larger than 50 [μA] but smaller than 100 [μA], the diagnostic result flag is set to "3"; when the average is the same as or larger than 100 [μA], the diagnostic result flag is set to "4". Alternatively, a linear result may be outputted by use of a mathematical expression.

It may be allowed that the control apparatus 108a performs its control in the following manner: the control apparatus 103a reads the diagnostic result flag; when the diagnostic result flag becomes "1" (it is determined that a smolder has occurred), the control apparatus 108a controls the energization duration, the energization starting timing, and the de-energization duration of the second switching circuit 505 so as to increase the secondary current in order to securely produce a spark discharge even at a time of smoldering.

Because the actually occurrable maximum smolder level and spark-discharge generation voltage are 0.3 [MΩ] and 30 [kV], respectively, it is conceivable to estimate the secondary-current output that suppresses the smolder. In order to generate 30 kV at a stage before energy flows into a smolder path, it is required that the ignition coil outputs the secondary current of 100 mA or more.

In general, the discharging energy required at a time when a discharge is produced in a state where no smolder exists is 12 [mJ]; the time that elapses before a dielectric breakdown and the capacitive discharging current are substantially 20 [μs] and 2 [A], respectively. In consideration of the state where the resistance value at a time of smoldering is substantially 0.3 [MΩ], the secondary-current condition for causing a dielectric breakdown is calculated by way of trial. As a result, when the state where the secondary current is the same as or larger than 100 [mA] is continued for 0.5 [ms] or longer, the energy becomes 15 [mJ] and hence there can be secured the performance capable of causing a dielectric breakdown even under a smolder environment.

A smolder state is detected and only when it is determined that a smolder has occurred, the output is increased only by a required amount, so that it is made possible that the ignitability is effectively improved and that consumption of the electrodes of the ignition plug 103 and excessive generation of NOx due to discharging are suppressed. Accordingly, it is only necessary that the setting is made in such a way that the secondary current can be increased so that when required, the state where the secondary current is the same as or larger than 100 [mA] can continue for more than 0.5 [ms].

4. Embodiment 4

Figure 9:
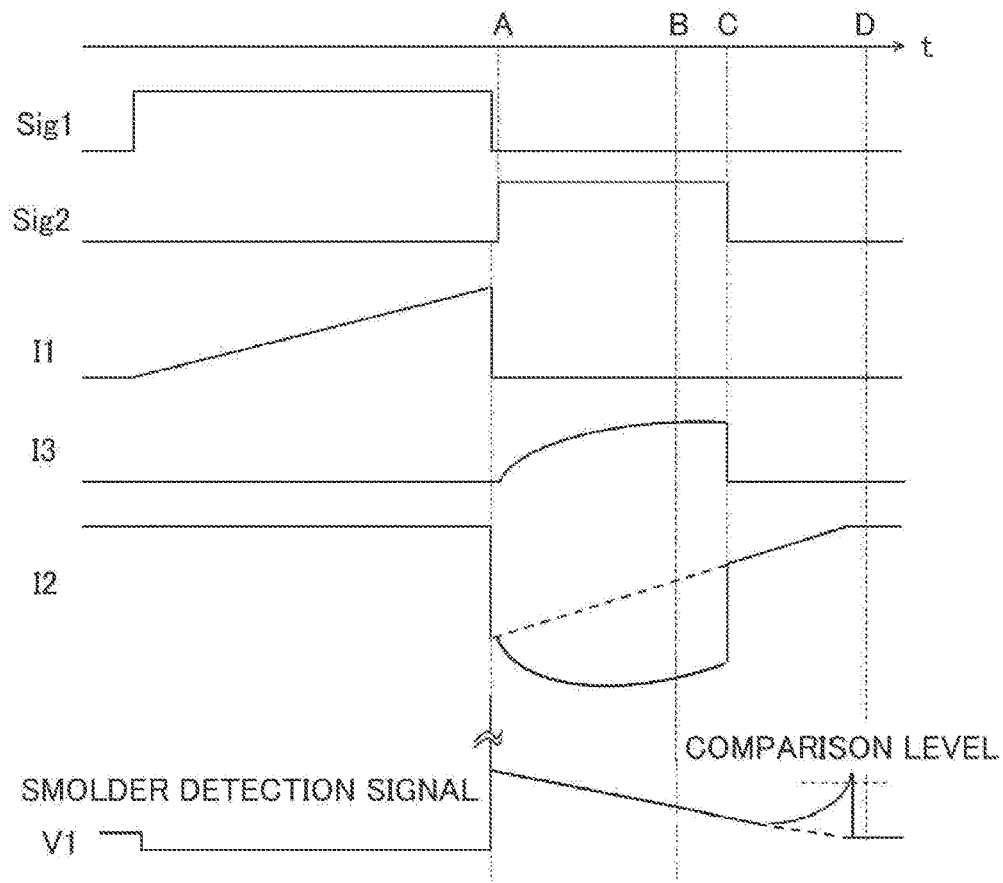
FIG. 9 is a timing chart representing operation of the internal-combustion-engine ignition apparatus according to Embodiment 4.

FIG. e is a circuit diagram of an ignition apparatus 10b according to Embodiment 4. FIG. 9 is a timing chart representing operation of the ignition apparatus 10b according to Embodiment 4.

The ignition apparatus 10b according to Embodiment 4 is provided with a smolder detection circuit 111 in an ignition coil 104b. The control apparatus 108b receives the output signal of the smolder detection circuit 111 by way of a smolder diagnosis unit 112 and then estimates the smolder state. The control apparatus 108b performs on/off-control of the second switching circuit by way of an output circuit 93b so as to increase the secondary current. Embodiment 4 is different from Embodiment 3 in that in order to estimate whether or not a smolder exists, a discharge voltage generated in the gap of the ignition plug 103 is detected and then the determination is performed.

Figure 8:
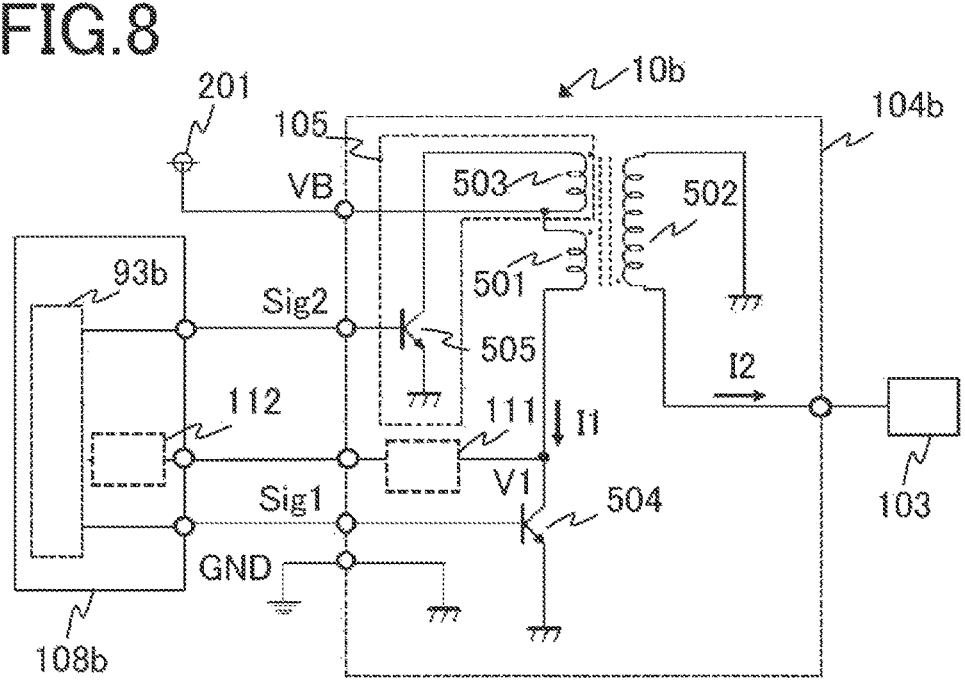
FIG. 8 is a circuit diagram of an internal-combustion-engine ignition apparatus according to Embodiment 4.

In the configuration diagram represented in FIG. 8, in order to detect the discharge voltage in the ignition plug 103, a primary voltage V1 generated in the primary coil 501 is detected. However, each of the respective voltages generated in the tertiary coil 503 and the secondary coil 502 magnetically coupled with the primary coil 501 in the ignition coil 104 has a tendency the same as that of the primary voltage V1 generated in the primary coil 501. Accordingly, it may be allowed that as the detection of the discharge voltage in the ignition plug 103, the secondary voltage generated in the secondary coil 502 and the tertiary voltage generated in the tertiary coil 503 are detected in order to estimate the occurrence of a smolder.

In the ignition apparatus 10b according to Embodiment 4, the primary voltage V1 generated in the primary coil 501 represented in FIG. 8 is utilized as the smolder detection signal; the smolder detection circuit 111 is provided at the primary side of the ignition coil 104 so that the voltage is detected. However, it is also made possible that the smolder detection circuit 111 is taken in by the smolder diagnosis unit 112 so as to be incorporated in the control apparatus 108b.

As is the case with Embodiment 3, through an A/D converter, the smolder detection signal is received by the computing processing unit 90 in the control apparatus 108b. The smolder diagnosis unit 112 is configured as software in the computing processing unit 90.

In the timing chart in FIG. 9, the abscissa denotes a time point (or a crank angle). In sequence from top to bottom of FIG. 9, there are represented the ignition signal Sig 1 for controlling the first switching circuit 504, the signal Sig 2 for controlling the second switching circuit 505, the primary current I1 flowing in the primary coil 501, the tertiary current I3 flowing in the tertiary coil 503, and the secondary current I2 flowing in the secondary coil 502. As the smolder detection signal, the primary voltage V1 is represented at the lowermost stage.

The primary voltage V1, which is a smolder detection signal at a time when a smolder exists, is represented by a broken line in FIG. 9. The smolder detection signal at a time when no smolder exists is represented by a solid line in FIG. 9. At the dielectric breakdown timing (A), as the primary voltage V1, which is the smolder detection signal, a voltage associated with the dielectric breakdown voltage is generated; thus, in order to prevent any erroneous detection, the smolder diagnosis unit 112 masks this period (A to B) so as to neglect the generated voltage.

Due to the operation of the ignition coil 104, when a smolder exists, the voltage between the electrodes of the ignition plug 103 decreases as the primary voltage V1 in FIG. 9, which is the smolder detection signal. By use of this voltage, the smolder diagnosis unit 112 diagnoses (estimates) whether or not a smolder has occurred, depending on whether or not the smolder diagnosis signal reaches at least one of set comparison level voltages.

The smolder diagnosis unit 112 sets the masking period (A to B) starting from the discharge start (A) and neglects the signal state during the masking period. The masking period (A to B) is, for example, substantially 1 [ms].

The smolder diagnosis unit 112 sets a comparison voltage to be compared with the smolder detection signal and then diagnoses whether or not the smolder detection signal reaches the comparison level during the smolder-detection-signal comparison period (B to D) after the masking period (A to B). The comparison period is, for example, substantially 2 [ms]; the comparison voltage is, for example, substantially 800 [V].

When the smolder diagnosis unit 112 diagnoses that a smolder has occurred in the subsidiary combustion chamber 102, the control apparatus 108b controls the second switching circuit 505. Then, the control apparatus 108b increases the secondary current in the ignition coil 104, so that deterioration of the ignitability due to a smolder in the ignition plug 103 can effectively be improved.

In order to detect the primary voltage in the primary coil 501 and the tertiary voltage in the tertiary coil 503, the first switching circuit 504 and the second switching circuit 505 may be incorporated in the control apparatus 108b. This method decreases the number of wiring leads in the ignition coil 104; thus, the system size can be reduced.

The ignition apparatus 10b according to Embodiment 4 makes it possible that although the smolder-level detection accuracy decreases, the smolder state in the subsidiary combustion chamber 102 is diagnosed by a simpler system configuration. In addition, only when it is estimated that a smolder has occurred, the secondary current is increased, so that it is made possible that consumption of the electrodes of the ignition plug 103 and excessive generation of NOx due to discharging are suppressed.

5. Embodiment 5

Figure 10:
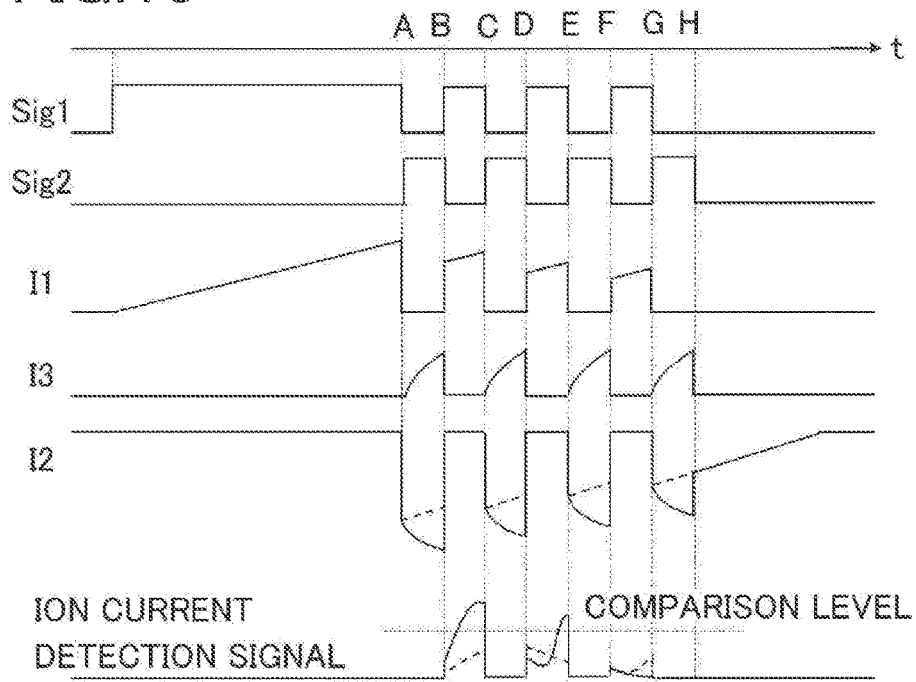
FIG. 10 is a timing chart representing operation of an internal-combustion-engine ignition apparatus according to Embodiment 5.

FIG. 10 is a timing chart representing operation of an ignition apparatus 10a according to Embodiment 5. The basic circuit configuration and operational principle of Embodiment 5 are the same as those of Embodiment 3. Embodiment 5 is different from Embodiment 3 in that the ignition signal Sig 1 and the signal Sig 2 are turned on and off two or more times in the same combustion stroke. The control apparatus 108a performs sub-energization two or more times under an operational condition in which it is determined that the ignitability needs to be raised. Because being the same as Embodiment 1, the hardware configuration of the ignition apparatus according to Embodiment 2 will be explained as the ignition apparatus 10a and the control apparatus 106a.

The basic circuit configuration and the operation of the energy-changeable circuit 105 in the ignition apparatus 10b according to Embodiment 5 are the same as those of Embodiment 3. In addition, the basic circuit configuration of the ion current detection circuit is also the same as that of Embodiment 3.

In the timing chart in FIG. 10, the abscissa denotes a time point (or a crank angle). In sequence from top to bottom of FIG. 10, there are represented the ignition signal Sig 1 for controlling the first switching circuit 504, the signal Sig 2 for controlling the second switching circuit 505, the primary current I1 flowing in the primary coil 501, the tertiary current I3 flowing in the tertiary coil 503, and the secondary current I2 flowing in the secondary coil 502. The ion current detection signal is represented at the lowermost stage.

FIG. 10 represents operational waveforms in the interval where the ion current detection circuit 106 estimates the combustion state and then the second switching circuit 505 is controlled. The ion current detection signal to be detected by the ion current detection circuit 106 becomes GND-level while the secondary current is generated; thus, the combustion state cannot be detected. The control apparatus 108a performs sub-energization in which after the first switching circuit 504 for controlling the primary coil 501 applies and cuts off the primary-coil current, the first switching circuit 504 is turned and on again. As a result, the discharge is stopped, so that the combustion state can be detected by means of the ion current detection signal. The ion current diagnosis unit 307 diagnoses (estimates) the combustion state in accordance with information of the ion current detection signal and the comparison level.

With regard to the combustion determination, when the ion current detection signal is smaller than a combustion determination value (at least one combustion determination value is set), the ion current diagnosis unit 107 determines that the combustion state is bad. Each time it is determined that the combustion state is bad, the number of the determinations is counted every stroke. When after and including the next combustion stroke, the number of the determinations exceeds a specific times, for example, 100 [cycle], occurrence of a smolder and/or a misfire are estimated. Then, in order to raise the ignitability in the subsidiary combustion chamber 102, the control apparatus 108b controls the second switching circuit 505 so as to increase the secondary current in the ignition coil 104. As a result, the ignitability is effectively improved. In addition, when not required, the secondary current is suppressed from increasing, so that it is made possible that consumption of the electrodes of the ignition plug 103 and excessive generation of NOx due to discharging are suppressed.

6. Embodiment 6

Figure 11:
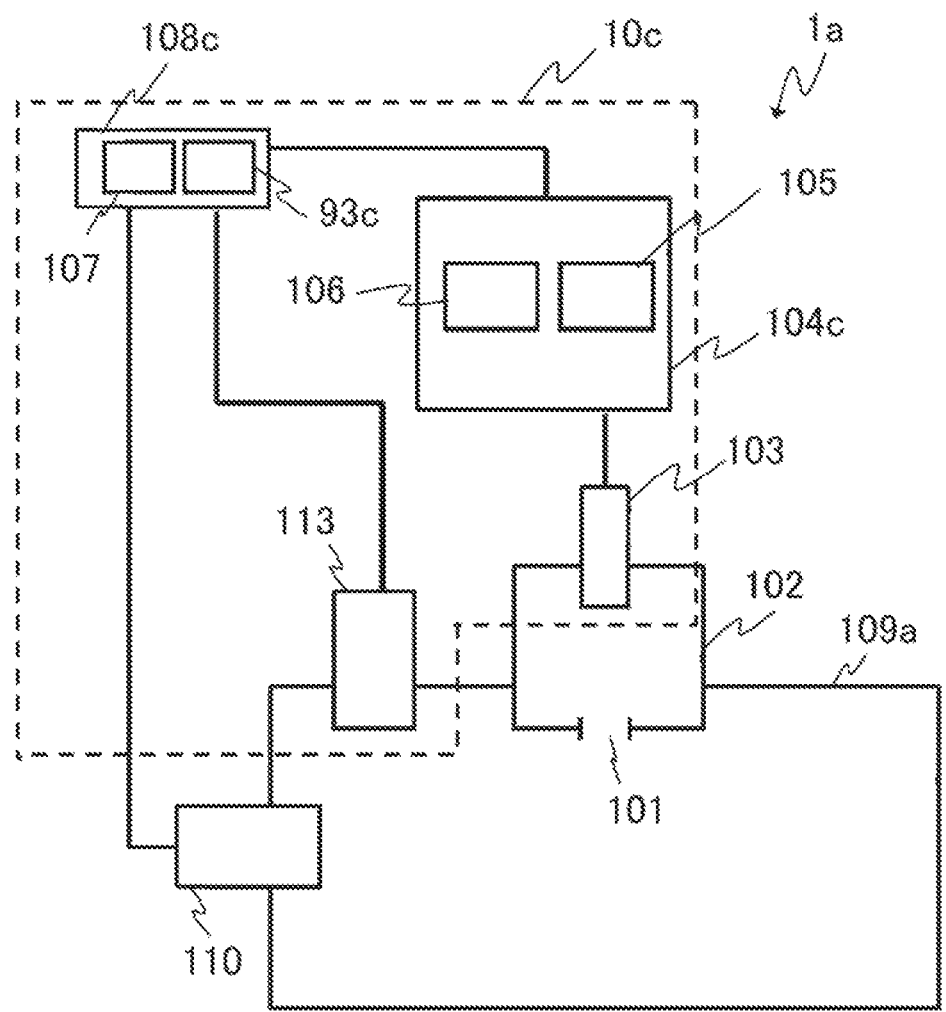
FIG. 11 is a configuration diagram of an internal combustion engine according to Embodiment 6.

FIG. 11 is a configuration diagram of an internal combustion engine 1a according to Embodiment 6. The internal combustion engine 1a according to Embodiment 6 has an ignition apparatus 10c. The control apparatus 108c in the ignition apparatus 10c estimates the combustion state by means of the ion current detection circuit 106. Then, the control apparatus 108c controls the second switching circuit 505 in the ignition coil 104 by way of the output circuit 93c so as to increase the secondary current. In the case where even when the secondary current is increased, the combustion state is not improved, the control apparatus 108c operates the inner-cylinder-flow enhancement apparatus 133 for enhancing the inner-cylinder flow, by way of the output circuit 93c.

Embodiment 6 is different from each of Embodiments 3 and 5 in that the configuration of the ignition apparatus 10c in the internal combustion engine 1a is provided with the inner-cylinder-flow enhancement apparatus 113 for enhancing the flow in the main combustion chamber 109. The inner-cylinder-flow enhancement apparatus 113 accelerates the flow of a fuel-air mixture in the combustion chamber through valve timing control for controlling the valve lift amounts of the intake valve and the exhaust valve and the valve on/off timing, intake-port switching control for changing the length of the intake port, rotation-speed changing control, and the like. The inner-cylinder-flow enhancement apparatus 113 increases the fuel-air mixture that enters the subsidiary combustion chamber, so that the scavenging performance can be improved and the ignitability can effectively be improved.

In the case where even when the control apparatus 108c controls the second switching circuit 505 so as to increase the secondary current, the ion current diagnosis unit 107 determines, based on the ion detection signal, that the ignitability in the subsidiary combustion chamber 102 is bad, the control apparatus 108c controls the inner-cylinder-flow enhancement apparatus 113 so as to enhance the inner-cylinder flow in the main combustion chamber in order to eliminate and scavenge stagnation of non-combusted gas or combusted gas.

Because when the inner-cylinder flow is enhanced, the second switching circuit 505 is made to perform the control so as to increase the secondary current, blow-off of a discharge between the electrodes of the ignition plug can be suppressed; thus, the ignitability can be secured.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

What is claimed is:

1. An internal-combustion-engine ignition apparatus for an internal combustion engine having a main combustion chamber and a subsidiary combustion chamber with which a fuel-air mixture in the main combustion chamber is ignited by combustion gas to be injected through an orifice provided between the main combustion chamber and the subsidiary combustion chamber, the internal-combustion-engine ignition apparatus comprising:

an ignition plug provided in the subsidiary combustion chamber;

an ignition coil having a primary coil, a secondary coil that is magnetically coupled with the primary coil and supplies a secondary current to the ignition plug, and a tertiary coil magnetically coupled with the primary coil and the secondary coil;

a first switching circuit that turns on or off energization from a power source to the primary coil;

a second switching circuit that turns on or off energization from the power source to the tertiary coil; and a controller that estimates a combustion state in the subsidiary combustion chamber based on an operating state of the internal combustion engine, that performs on/off-control of the first switching circuit so that the secondary current is generated in the secondary coil by a change in magnetic flux generated in the primary coil and a spark discharge is produced in the ignition plug and that performs on/off-control of the second switching circuit so that magnetic flux in the tertiary coil is changed so as to increase the secondary current, when deterioration of the combustion state including one of a misfire and a smolder has been estimated in the subsidiary combustion chamber.

2. The internal-combustion-engine ignition apparatus according to claim 1, wherein the controller performs on/off-control of the first switching circuit two or more times during a single compression stroke and combustion stroke of the internal combustion engine so that the secondary current is generated two or more times in the secondary coil and that performs on/off-control of the second switching circuit so that magnetic flux in the tertiary coil is changed so as to increase the secondary current, when the deterioration of the combustion state has been estimated in the subsidiary combustion chamber.

3. The internal-combustion-engine ignition apparatus according to claim 1, wherein the controller estimates the combustion state in the subsidiary combustion chamber in accordance with at least one of an inner-cylinder pressure, a rotational fluctuation, a rotation speed, a throttle opening degree, and a coolant temperature of the internal combustion engine.

4. The internal-combustion-engine ignition apparatus according to claim 1, further comprising an ion current detection circuit that is provided at one end of the secondary coil and detects an ion current, wherein the controller estimates the deterioration of the combustion state in the subsidiary combustion chamber based on the ion current detected by the ion current detection circuit.

5. The internal-combustion-engine ignition apparatus according to claim 4, wherein the controller performs counting of instances in each of which the deterioration of the combustion state in the subsidiary combustion chamber has been estimated based on the ion current detected by the ion current detection circuit and performs on/off-control of the second switching circuit so that magnetic flux in the tertiary coil is changed so as to increase the secondary current, when a value obtained through the counting is larger than a predetermined determination value.

6. The internal-combustion-engine ignition apparatus according to claim 1, further comprising a voltage detection circuit for detecting a discharge voltage generated in a gap of the ignition plug, wherein the controller estimates the deterioration of the combustion state in the subsidiary combustion chamber based on the discharge voltage detected by the voltage detection circuit.

7. The internal-combustion-engine ignition apparatus according to claim 6, wherein the voltage detection circuit detects a primary voltage in the primary coil.

8. The internal-combustion-engine ignition apparatus according to claim 1, wherein in the case where the deterioration of the combustion state in the subsidiary combustion chamber has been estimated, the controller performs on/off-control of the second switching circuit so that the secondary current of 100 mA or larger is maintained for 0.5 ms or longer.

9. The internal-combustion-engine ignition apparatus according to claim 1,
wherein the internal combustion engine has an inner-cylinder-flow enhancement apparatus for enhancing a flow of the fuel-air mixture in the main combustion chamber, and
wherein in the case where the deterioration of the combustion state in the subsidiary combustion chamber has been estimated, the controller performs on/off-control of the second switching circuit so as to change magnetic flux in the tertiary coil and concurrently enhances the flow of the fuel-air mixture in the main combustion chamber by means of the inner-cylinder-flow enhancement apparatus.

10. The internal-combustion-engine ignition apparatus according to claim 1, wherein in accordance with an operating state of a vehicle in which the internal combustion engine is mounted, the controller determines a number of on/off-control actions of the second switching circuit in each compression and combustion stroke of the internal combustion engine.

* * * * *